United States Patent [19]

Matsumoto et al.

[11] Patent Number: 4,760,449

[45] Date of Patent: Jul. 26, 1988

[54] VIDEO SIGNAL PROCESSING APPARATUS

[75] Inventors: Tokikazu Matsumoto, Osaka; Yukio Nakagawa, Moriguchi; Masahiro Honjo, Neyagawa, all of Japan

[73] Assignee: Matsushita Electric Industrial Co., Ltd., Osaka, Japan

[21] Appl. No.: 846,819

[22] Filed: Apr. 1, 1986

[30] Foreign Application Priority Data

Apr. 3, 1985 [JP] Japan .................. 60-70257
Jun. 27, 1985 [JP] Japan .................. 60-140814

[51] Int. Cl.$^4$ .................. H04N 5/21; H04N 9/64
[52] U.S. Cl. .................. 358/167; 358/36
[58] Field of Search .................. 358/160, 166, 167, 36, 358/37, 405

[56] References Cited

U.S. PATENT DOCUMENTS 4,355,333 10/1982 Sato .................. 358/160
4,571,613 2/1986 Fukuda .................. 358/36
4,677,486 6/1987 Noda .................. 358/167

FOREIGN PATENT DOCUMENTS 167387 1/1986 European Pat. Off. .................. 358/167

Primary Examiner—Tommy P. Chin
Attorney, Agent, or Firm—Wenderoth, Lind & Ponack

[57] ABSTRACT

A video signal processing apparatus incorporates a 1H or 2H delay circuit, wherein H is a horizontal synchronization period. The output of the delay circuit is fed back to the input thereof so as to average the noise, thus raising the signal S/N ratio. The feedback line includes a nonlinear processing circuit which has a small gain when the signal input has a low vertical correlation, whereby the signal S/N ratio is improved without causing the delay of the color signal in the vertical direction nor the deteriorated resolution of the luminance signal.

11 Claims, 3 Drawing Sheets

VIDEO SIGNAL PROCESSING APPARATUS

BACKGROUND OF THE INVENTION

1. Field of the Invention

The present invention relates to a video signal processing apparatus for use in a video tape recorder (VTR).

2. Description of the Prior Art

To raise the S/N ratio of the video signal processed in VTR's, a recursive filter has been used for video signal processing. The recursive filter involves a delay circuit for delaying the video signal by 1H or 2H (H: horizontal synchronization period). The filter feeds output of the delay circuit back to the input thereof to average the signal noise, thus raising the video signal S/N ratio.

With the conventional circuit construction, however, when the video signal has a low vertical correlation, i.e. when the signal input to the recursive filter shows a sudden change, the filter cannot follow the output change promptly. If such a circuit is used in processing color signals, a delay in color change causes a downward color offset (color offset in a downward direction on the TV screen due to the color signal delay with respect to the luminance signal). If the luminance signal is processed with this circuit, the vertical resolution will deteriorate.

SUMMARY OF THE INVENTION

It is an object of the present invention to provide a video signal processing apparatus that does not cause a downward color offset when passing the carrier chrominance signal through a recursive filter which incorporates a 1H or 2H delay circuit It is also an object of the present invention to provide a video signal processing apparatus which does not cause a downward color offset when passing the chrominance difference signal through a recursive filter incorporating a 1H or 2H delay circuit, and which does not cause a deteriorated vertical resolution when passing the luminance signal through the recursive filter.

To achieve the above objects, the video signal processing apparatus of the present invention comprises: a delay circuit for delaying an input signal by a predetermined period of time; a first operational circuit for conducting an addition or subtraction operation between an output signal of the delay circuit and an input video signal; a nonlinear processing circuit for receiving an output signal from the first operational circuit as an input signal and for generating first and second output signals, said first output signal having a gain of K with respect to its input signal which decreases with an increase of the absolute value of said input signal level and becomes zero when an absolute value of said input signal exceeds a specified value, and said second output having a gain of $\frac{1}{2}(1+K)$ with respect to its input signal; a second operational circuit for conducting an addition or subtraction operation between the first output signal of the nonlinear processing circuit and the input video signal and for outputting the result to the input of the delay circuit; and a third operational circuit for conducting an addition or subtraction operation between the second output signal of the nonlinear processing circuit and the input video signal.

DESCRIPTION OF THE PREFERRED EMBODIMENTS

Figure 1A:
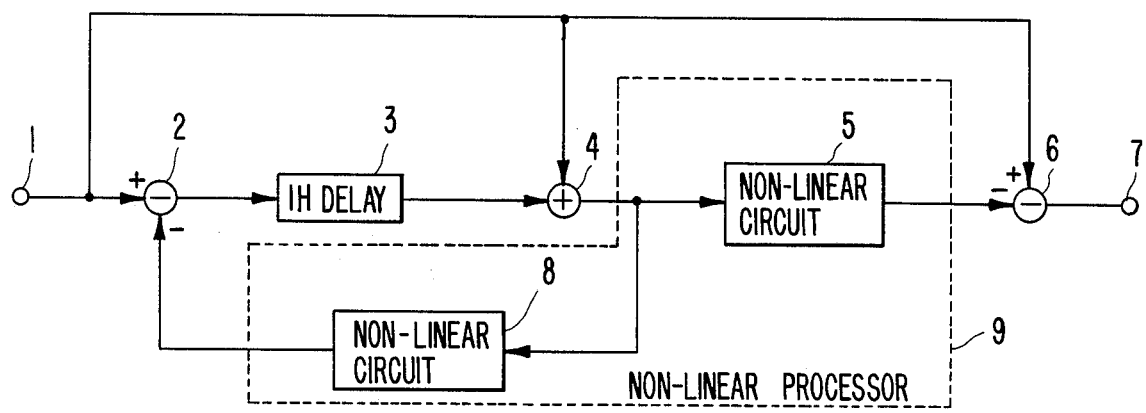
FIG. 1(a) is a block diagram showing a first embodiment of the present invention.
Figure 1B:
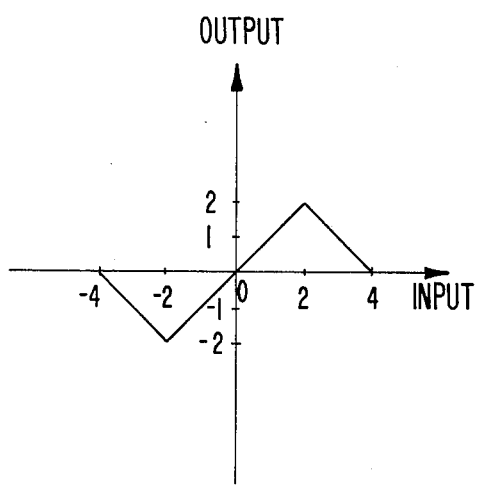
FIGS. 1(b) and 1(c) are charts respectively showing the input/output characteristics of the nonlinear processing circuits 8 and 5 in the first embodiment of the present invention.
Figure 1C:
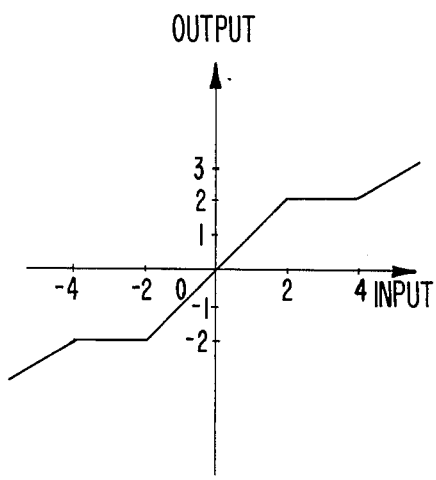

Some embodiments of the present invention will be described below with reference to the accompanying drawings. FIG. 1(a) is a block diagram showing the first embodiment of the color signal processing apparatus according to the present invention. FIGS. 1(b) and 1(c) respectively show the input/output (I/O) characteristics of the nonlinear processing circuits 8 and 5 in the first embodiment. In this case, the input video signal is the NTSC carrier chrominance signal.

The carrier chrominance signal is inputted through an input terminal 1 and enters a subtractor 2 which subtracts an output signal of a nonlinear processing circuit 8 from the input carrier chrominance signal. The output signal of the subtractor 2 enters a 1H delay circuit 3. The output signal of the 1H delay circuit 3 is added to the carrier chrominance signal by an adder 4. The output signal of the adder 4 is fed to nonlinear processing circuits 5 and 8 which constitute a nonlinear processor 9. The output signal of the nonlinear processing circuit 8 is fed back to the subtractor 2. The output signal of the nonlinear processing circuit 5 is subtracted from the carrier chrominance signal by a subtractor 6. The output signal of the subtractor 6 is fed to an output terminal 7. The nonlinear processing circuits 5 and 8 are assumed to have linear characteristics with gains of $\frac{1}{2}(K+1)$ and K, respectively. The transfer function $G_1(S)$ from the input terminal 1 to the output terminal of the adder 4 is expressed by the following formula:

$$G_1(S) = \frac{1 + Z^{-1}}{1 + KZ^{-1}} \quad (2)$$

The transfer function $G_0(S)$ from the input terminal 1 to the output terminal 7 is expressed by the following formula:

$$G_0(S) = \frac{1-K}{2} \times \frac{1 - Z^{-1}}{1 + KZ^{-1}} \quad (3)$$

Figure 2A:
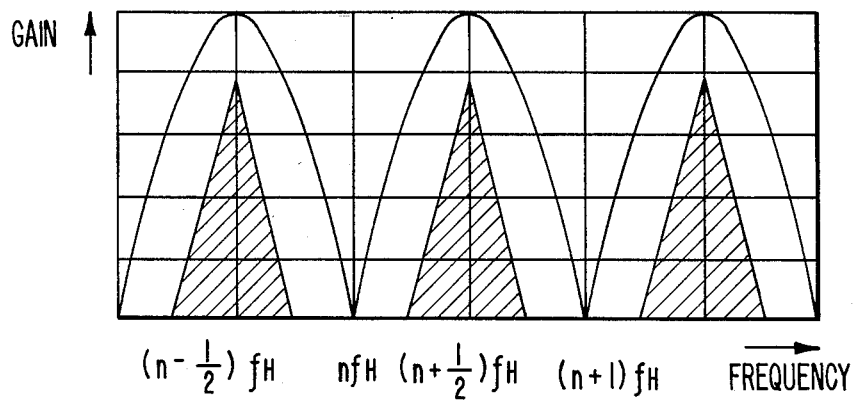
FIG. 2(a) is a chart showing the frequency characteristics and the carrier chrominance signal spectrum of the first embodiment of the present invention.

The transfer function $G_1(S)$ provides a comb filter characteristic having peaks at the frequencies of integral multiples of the horizontal synchronization frequency fH, and nodes at the frequencies of (integer + $\frac{1}{2}$)

multiples of fH. The transfer function $G_0(S)$ provides a comb filter characteristic having peaks at the frequencies of (integer $+\frac{1}{2}$) multiples of the horizontal synchronization frequency fH and nodes at the frequencies of integral multiples of fH. In FIG. 2(a), the frequency characteristic is indicated by the curve and the carrier chrominance signal spectrum by the crosshatching, with the frequency along the axis of the abscissa and the gain along the axis of the ordinate.

As shown in FIG. 2(a), since the energy of the carrier chrominance signal spectrum concentrates is concentrated at the frequencies of (integer$+\frac{1}{2}$) multiples of fH, the carrier chrominance signal spectrum alone is outputted to the output terminal 7, whereby the color signal S/N ratio is improved. $G_1(S)$ has peaks at the frequencies of integral multiples of the horizontal synchronization frequency, the spectra at which frequencies increase when the carrier chrominance signal has a lower vertical correlation. Accordingly, a noncorrelation signal is obtained at the output terminal of the adder 4. The non-correlation signal is then fed back to the subtractor 2 through the non-linear processing circuit 8.

The above description is based on the assumption that the non-linear processing circuit 8 has a constant gain of K. The constant gain will result in a constant feedback even with a large output signal of the adder 4, or with a low vertical correlation, and therefore will cause a downward color offset when color changes in the vertical direction. In this embodiment of the invention, non-linear characteristics are given to the gains of the non-linear processing circuits 5 and 8 to prevent the downward color offset.

FIGS. 1(b) and 1(c) show the I/O characteristics of the non-linear processing circuit 8 and 5, respectively, employed in the present embodiment of the invention. As shown in FIG. 1(b), the non-linear processing circuit 8 provides a limitter characteristic so that it has no output when the input signal level is high. Specifically, when the color signal correlation is low, the input signal level to the nonlinear processing circuit 8 becomes large so that the nonlinear processing circuit 8 does not produce an output signal to be fed back to the delay circuit 3. Because of the absence of the signal feedback, the present embodiment is free from downward color offset. Moreover, according to the first embodiment of the invention, the nonlinear processing circuit 5 is set to have a gain of $\frac{1}{2}(1+K)$ for the gain of K of the nonlinear processing circuit 8. With an input signal level of "3", for instance, the nonlinear processing circuit 8 outputs "1". In this case, the value of K is "$\frac{1}{3}$"(K=1÷3=$\frac{1}{3}$). Hence, the gain of the nonlinear processing circuit 5 for the input level of "3" is "$\frac{2}{3}$" as the result of the calculation of $\frac{1}{2}(1+\frac{1}{3})$. The output signal of the circuit 5, which is the product of the input ,"3" and the gain "$\frac{2}{3}$", is therefore "2". Thus, the output signal of the nonlinear processing circuit 5 for each input level can be set according to the I/O characteristic of the nonlinear processing circuit 8. The reason for setting the I/O characteristic of the nonlinear processing circuit 5, as described above, is to attain "1" as a peak gain of $G_0(S)$. When the carrier chrominance signal is a PAL signal, a 2H delay circuit is used in place of the 1H delay circuit because the carrier chrominance signal provides correlation at intervals of 2H.

The non-linear processing circuit 8 may have a gain which decreases as the input signal level absolute value increases and which becomes zero when the input signal level absolute value exceeds a specified value. The non-linear processing circuit 5 may have a gain expressed as $\frac{1}{2}(1+K)$, where K is the gain of the non-linear processing circuit 8. The circuits having such gains can be easily realized by known art.

The embodiment of FIG. 1 (a) can better be realized by a digital circuit. The 1H delay circuit 3 can be configured by a shift register. The non-linear circuits 5 and 8 are each configured by a read-only memory (ROM). The output signal of the adder 4 is supplied to the ROM as an address signal, and the ROM outputs a data signal stored in the address specified by the address signal. By the use of the ROM, any non-linear characteristic can be easily realized for each of the non-linear circuits 5 and 8.

Figure 3:
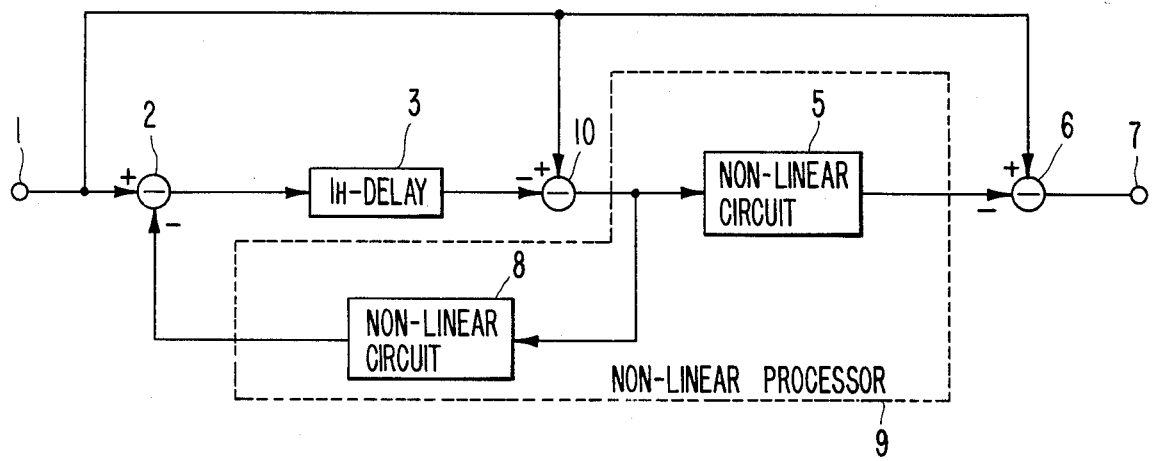
FIG. 3 is a block diagram showing a second embodiment of the present invention.

A second embodiment of the present invention will now be described referring to FIG. 3 which shows an example of the present invention applied for processing a demodulated chrominance difference signal or a luminance signal. The R-Y signal and B-Y signal are examples of the chrominance difference signals. The signal processor circuit for one of the two chrominance difference signals is shown in FIG. 3; the other chrominance difference signal is processed in a separate but identical signal processor circuit as shown in FIG. 3. The chrominance difference signal inputted through the input terminal 1 enters a subtractor 2 which subtracts an output signal of the nonlinear processing circuit 8 from the input chrominance difference signal. The output signal of the subtractor 2 enters the 1H delay circuit 3. The output signal of the 1H delay circuit 3 is subtracted from the input chrominance difference signal by a subtractor 10. The result is then inputted to the nonlinear processing circuit 5 and to the nonlinear processing circuit 8 from which the signal is fed back to the subtractor 2. The output signal of the nonlinear processing circuit 5 is subtracted from the input chrominance difference signal by the subtractor 6, the result being outputted to the output terminal 7.

Similar to the previous embodiment, the nonlinear processing circuits 5 and 8 are assumed to have linear characteristics, with gains of $\frac{1}{2}(K+1)$ and K, respectively. The transfer function $H_1(S)$ from the input terminal 1 to the output terminal of the subtractor 6 is expressed by the following formula:

$$H_1(S) = \frac{1 - Z^{-1}}{1 - KZ^{-1}} \quad (4)$$

The transfer function $H_0(S)$ from the input terminal 1 to the output terminal 7 is expressed by the following formula:

$$H_0(S) = \frac{1-K}{2} \times \frac{1 + Z^{-1}}{1 - KZ^{-1}} \quad (5)$$

Figure 2B:
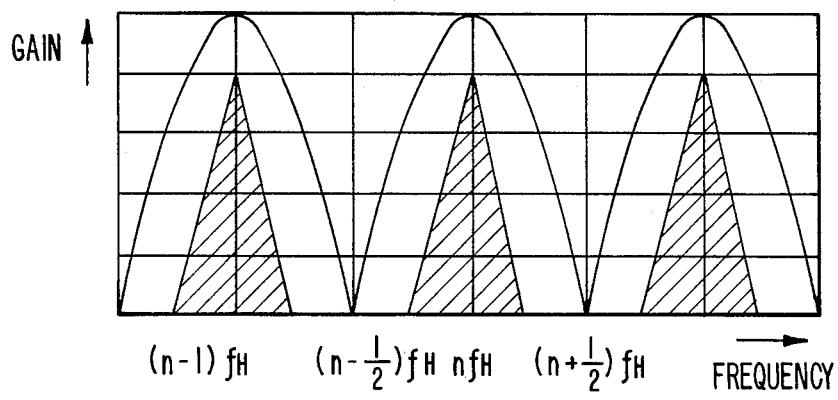
FIG. 2(b) is a chart showing the frequency characteristics and the spectrum of the color difference or luminance signal of the second embodiment of the present invention.

The transfer function $H_1(S)$ provides a comb filter characteristic having peaks at the frequencies of (integer$+\frac{1}{2}$) multiples of the horizontal synchronization frequency fH an nodes at the frequencies of integral multiples of fH. The transfer function $H_0(S)$ provides a comb filter characteristic having peaks at the frequencies of integral multiples of the horizontal synchronization frequency fH and nodes at the frequencies of (integrer$+\frac{1}{2}$) multiples of fH. In FIG. 2(b), the frequency characteristic of $H_0(S)$ is indicated by the curve and the chrominance difference signal (or luminance signal)

spectrum by the crosshatching, with the frequency along the axis of the abscissa and the gain along the axis of the ordinate.

As indicated in FIG. 2 (b), since the energy of the chrominance difference signal spectrum concentrates is concentrated at the frequencies of integral multiples of fH, the chrominance difference signal spectrum alone is outputted to the output terminal 7, whereby the color signal S/N ratio is improved. The second embodiment of the invention is also free from downward color offset which could occur in the absence of vertical correlation of the chrominance difference signal, as well as from vertical resolution deterioration. The principle for preventing downward color offset and vertical resolution deterioration is not described here because it is the same as in the first embodiment. Moreover, according to the second embodiment of the invention, since two chrominance difference signals are processed by the separate but identical circuits, it is possible to prevent downward color offset for both hue and saturation factor variations only by taking appropriate measures against the downward color offset according to the vertical correlation of each chrominance difference signal level.

A third embodiment of the invention will now be described with reference to FIG. 4. The nonlinear processing circuit 12 corresponds to the nonlinear processing circuit 8 of the first embodiment. The nonlinear processing circuit 12, an adder 11 and a coefficient circuit 13 correspond to the nonlinear processing circuit 5 of the first embodiment.

Providing that a coefficient of the coefficient circuit 13 is "$\frac{1}{2}$" and the gain of the nonlinear processing circuit 12 is K, the gain between the outputs of the adder 4 and adder 11 is 1+K, and therefore the gain between the outputs of the adder 4 and the coefficient circuit 13 is $\frac{1}{2}(1+K)$. The gain between the outputs of the adder 4 and adder 11 of the third embodiment corresponds to the gain of the nonlinear processing circuit 5 of the first embodiment, in which gain is $\frac{1}{2}(1+K)$ assuming that the gain of the nonlinear processing circuit 8 is K, as described earlier. Thus, with the nonlinear processing circuit 12, adder 11 and coefficient circuit 13, assuming the function of the nonlinear processing circuit 5 of the first embodiment, the third embodiment yields the same effect as the first embodiment while involing only one nonlinear processing circuit. Specific operation of the third embodiment is omitted here because it is the same as that of the first embodiment.

Figure 4:
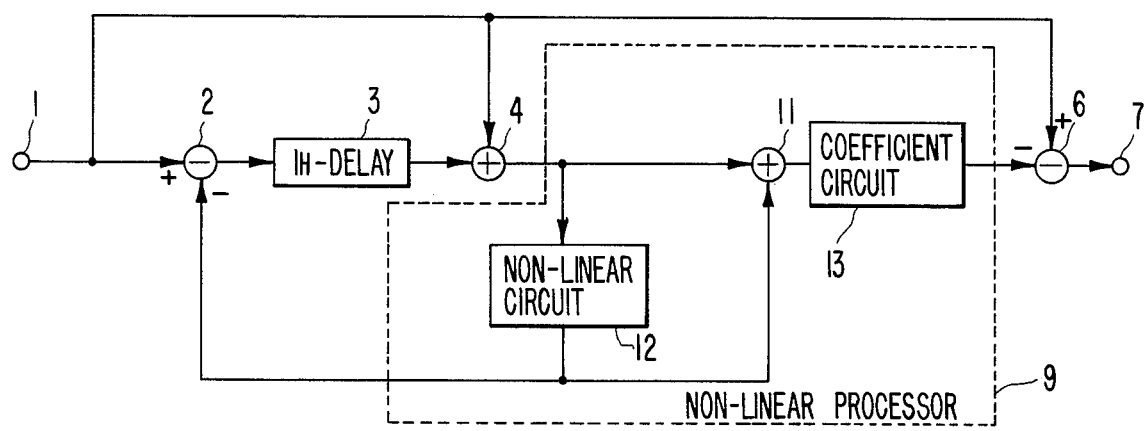
FIG. 4 is a block diagram showing a third embodiment of the present invention.

The embodiment of FIG. 4 can also better be realized by a digital circuit in the similar way to the first embodiment. The 1H delay circuit 3 can be configured by a shift register. The non-linear circuit 12 can be configured by a ROM. The coefficient circuit 13 can be configured by a shift register or a multiplier.

Figure 5:
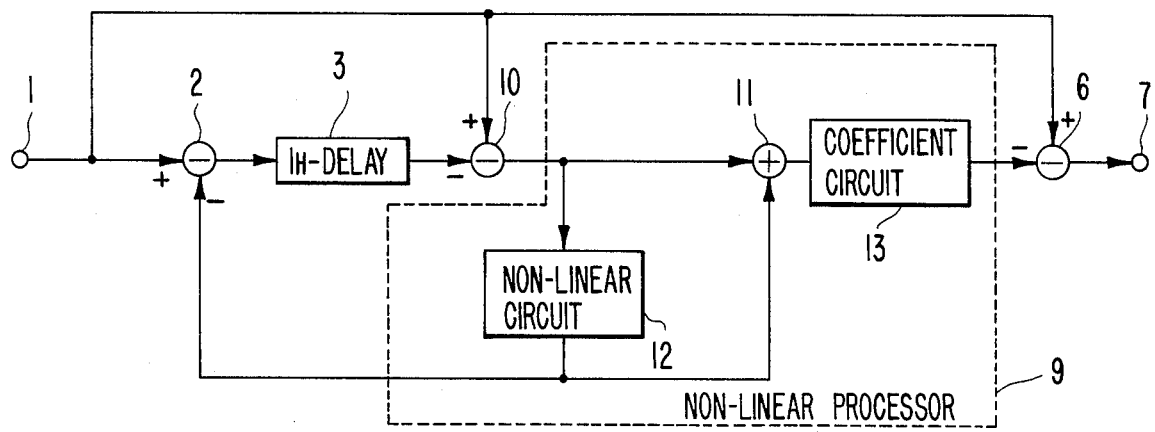
FIG. 5 is a block diagram showing a fourth embodiment of the present invention.

FIG. 5 is a block diagram of a fourth embodiment of the present invention. The fourth embodiment is comparable to the second embodiment. The subtractor 10 is used in place of the adder 4. The operation of the fourth embodiment is the same as that of the second embodiment and an explanation is therefore omitted here.

What is claimed is:
1. A video signal processing apparatus comprising:
    a delay circuit for delaying a signal input thereto by a predetermined period of time;
    a first operational circuit for conducting an addition or subtraction operation between an output signal of said delay circuit and an input video signal;
    a nonlinear processing circuit for receiving an output signal of said first operational circuit as a signal input thereto and for generating first and second output signals, said nonlinear processing circuit arranged such that said first output signal has a gain of K with respect to said signal input thereto that decreases with an increase of an absolute value of the level of said output signal from said first operational circuit and becomes zero when said absolute value exceeds a specified value, and said second output signal has a gain of $\frac{1}{2}(1+K)$ with respect to said signal input thereto;
    a second operational circuit for conducting an addition or subtraction operation between said first output signal of said nonlinear processing circuit and said input video signal and for outputting an operation result as said signal input to said delay circuit; and
    a third operational circuit for conducting an addition or subtraction operation between said second output signal of said nonlinear processing circuit and said input video signal and for outputting, as an operation result, a noise reduced video signal.

2. A video signal processing apparatus as claimed in claim 1, wherein said delay circuit delays said signal input thereto by 1H or 2H, wherein H is a horizontal synchronization period.

3. A video signal processing apparatus comprising:
    a delay circut for delaying a signal input thereto by a predetermined period of time;
    a first operational circuit for conducting an addition or subtraction operation between an output signal of said delay circuit and an input video signal;
    a first nonlinear processing circuit for receiving an output signal of said first operational circuit as an input signal thereto and for generating an output signal, said first nonlinear processing circuit arranged such that said output signal has a gain of K with respect to said signal input thereto which decreases with an increase of an absolute value of the level of said output signal from said first opeational circuit and becomes zero when said absolute value exceeds a specified value;
    a second operational circuit for conducting an addition or subtraction operation between an output signal of said first nonlinear processing circuit and said input video signal and for outputting an operation result as said signal input to said delay circuit;
    a second nonlinear processing circuit for receiving said output signal of said first operational circuit as an input signal thereto and for generating an output signal, said second nonlinear processing circuit arranged such that said output signal has a gain of $\frac{1}{2}(1+K)$ with respect to said signal input thereto; and
    a third operational circuit for conducting an addition or subtraction operation between said output signal of said second nonlinear processing circuit and said input video signal and for outputting, as an operation result, a noise reduced video signal.

4. A video signal processing apparatus as claimed in claim 3, wherein said delay circuit delays said signal input thereto by 1H or 2H, wherein H is a horizontal synchronization period.

5. A video signal processing apparatus as claimed in claim 3, wherein said input video signal is a carrier chorminance signal modulated by a chrominance subcarrier.

6. A video signal processing apparatus as claimed in claim 3, wherein said input video signal is a chrominance difference signal demodulated in the basic band or a luminance signal.

7. A video signal processing apparatus comprising:
a delay circuit for delaying a signal input thereto by a predetermined period of time;
a first operational circuit for conducting an addition or substraction operation between an output signal of said delay circuit and an input video signal;
a nonlinear processing ciruit for receiving an output signal of said first operational circuit as an input signal thereto and for generating an output signal, said nonlinear processing circuit arranged such that said output signal has a gain with respect to said signal input thereto which decreases with an increase of an absolute value of the level of said output signal from said first operational circuit and becomes zero when said absolute value exceeds a specified value;
a second operational circuit for conducting an addition or subtraction operation between an output signal of said nonlinear processing circuit and said input video signal and for outputting an operation result as said signal input to said delay circuit;
an adder circuit for adding said output signal from said nonlinear processing circuit to said output signal from said first operational circuit;
a coefficient circuit for multiplying an output signal of said adder circuit by a predetermined coefficient; and
a third operational circuit for conducting an addition or subtraction operation between an output signal of said coefficient circuit and said input video signal and for outputting, as an operation result, a noise reduced video signal.

8. A video signal processing apparatus as claimed in claim 7, wherein said delay circuit delays said signal input thereto by 1H or 2H, wherein H is a horizontal synchronization period.

9. A video signal processing apparatus as claimed in claim 7, wherein said predetermined coefficient of said coefficient circuit is ½.

10. A video signal processing apparatus as claimed in claim 7, wherein said input video signal is a carrier chrominance signal modulated by a chrominance subcarrier.

11. A video signal processing apparatus as claimed in claim 7, wherein said input video signal is a chrominance difference signal demodulated in the basic band or a luminance signal.

* * * * *